3,221,053
PREPARATION OF FORMAMIDE, GUANIDINE AND SALTS THEREOF

Horst Prietzel, Trostberg, Germany, assignor to Süddeutsche Kalkstickstoff-Werke Aktiengesellschaft, Trostberg, Germany
No Drawing. Filed July 3, 1962, Ser. No. 207,383
2 Claims. (Cl. 260—561)

The invention relates to the preparation of guanidine and guanidine salts from dicyandiamide.

A simple process for the preparation of guanidine salts consists in reacting dicyandiamide at elevated temperatures with ammonium salts. This process is commercially used for the manufacture of guanidine nitrate and guanidine hydrochloride. However, the reaction proceeds very incompletely when it is applied to the production of guanidine sulfate from dicyandiamide and ammonium sulfate. Guanidine carbonate cannot be prepared at all in this manner.

It is also known to hydrogenate dicyandiamide with zinc and hydrochloric acid to guanidine. This reaction has not achieved any practical significance, even for laboratory purposes; it needs not only large amounts of hydrogen according to the equation (1) $NC \cdot NH \cdot CNH \cdot NH_2 + 3H_2$
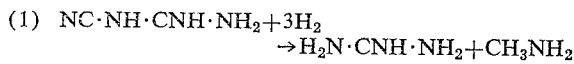
$\rightarrow H_2N \cdot CNH \cdot NH_2 + CH_3NH_2$ but it requires also a very difficult separation procedure to separate the guanidine from the also obtained methylamine.

I have found that guanidine and its salts may be obtained as very pure products by a simple and economic hydrogenolytic scission of dicyandiamide at temperatures of about 5 to 50° C. and pH values of 4 to 11, preferably below 10. The term "hydrogenolysis" is used here to designate a reaction where simultaneously with a hydrogenating fission of a molecule, produced by catalytically activated hydrogen, one mole of H₂O is added to one of the fission products. Under such conditions, where at least one mole of water per mole of dicyandiamide is present, the reaction proceeds not in accordance with Equation 1 but to equations (2) 

(3) 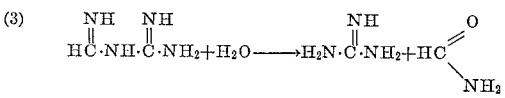

Equation 2 illustrates the first step of the catalytic hydrogenation of dicyandiamide, for instance with Raney nickel, to a not recoverable intermediate compound which at once hydrolyzes with formation of guanidine and formamide. This reaction mechanism is supported by the observation that no guanidine is formed in absolute alcohol.

The formamide formed in the reaction is a valuable byproduct which, after separation from the guanidine, can be used for various purposes.

The reaction is preferably carried out in water as the sole solvent but aqueous alcohol or other mixtures of water with organic solvents may also be used. Temperatures of about 5 to 50° C., preferably 5° C. to 30° C. and atmospheric or slightly elevated pressures are employed. Higher temperatures should be avoided as they favor a hydrolysis of the formed guanidine as well as the addition of water to dicyandiamide with formation of guanyl ureas, particularly in the presence of acids. For the same reason, and in order to steer the reaction in the desired direction (Equations 2 and 3), it is necessary to maintain a pH value above 4.

For the preparation of guanidine base, I may, for instance, add Raney nickel to dicyandiamide in water and shake the mixture in an atmosphere of hydrogen. During hydrogenation, the concentration may be so chosen that more dicyandiamide is used than dissolves in the liquid at reaction temperature. In the course of the reaction and during the progressive formation of the guanidine, which has an almost unlimited solubility in water, the entire dicyandiamide is split hydrogenolytically. Instead of Raney nickel, also Raney cobalt may be used as catalyst; however, the reaction rate is higher, and the yields are better with Raney nickel. Though I prefer to use the catalyst in the Raney form, other activated forms may also be employed.

For the preparation of the guanidine addition salts, an equivalent amount of the respective acid is added during the hydrogenolytic fission. The addition of the acid can be made periodically or continuously but only at such a rate that a pH above 4 is maintained. The salts are recovered by allowing the solution to crystallize.

In this way, practically all salts of guanidine with inorganic and organic acids can be prepared. For the preparation of guanidine carbonate, it is of advantage to use an equimolar mixture of hydrogen and carbon dioxide. In all cases, I prefer to adjust the concentration of the dicyandiamide so as to maintain the formed guanidine salt in solution.

My novel process requires only one third the amount of hydrogen which is necessary in the known hydrogenation process; it is generally applicable and allows the production of pure reaction products in high yields, which are readily recovered and not accompanied by troublesome by-products.

The separation from the simultaneously obtained formamide may be accomplished, in accordance with the procedure disclosed in the British Patent No. 815,841, page 2, lines 10 to 33, by precipitation as guanidine tetraborate and subsequent reaction with the acid of the desired guanidine salt. The boric acid liberated in this reaction is easily separated from the guanidine salts, due to the considerable difference in the solubilities.

Solubility in 100 g. water at 20° C.:

| | |
|---|---|
| Boric acid | g__ 4.8 |
| Guanidine hydrochloride | g__ 200 |
| Guanidine sulfate | g__ 280 |
| Guanidine acetate | Very soluble |

For the preparation of guanidine carbonate, the separation from the formamide may be carried out as follows: The aqueous solution of guanidine and formamide obtained in the hydrogenolysis is freed from the major part of the water by distilling it off in vacuo. Guanidine carbonate is precipitated by introduction of carbon dioxide.

The following examples are given to illustrate the invention. All parts are given by weight unless indicated otherwise.

Example 1 (guanidine)

0.6 part of Raney nickel in 100 parts by volume of water are shaken for 10 minutes in a hydrogen atmosphere in a hydrogenating flask. Subsequently 10 parts of dicyandiamide are added, and the hydrogenation is continued, at a temperature of about 20° C. 1900 parts by volume of hydrogen are taken up, whereby a strongly basic solution (pH=10–11) of guanidine is formed. The analysis of the solution showed a guanidine content of 4.91 parts, corresponding to a yield of 70 percent of theory, calculated on dicyandiamide.

Example 2 (guanidine hydrochloride)

10 parts of dicyandiamide are treated in aqueous solution in a hydrogenating flask in the presence of Raney nickel with hydrogen at a temperature of about 30° C. The obtained strongly alkaline solution (pH=8–9) is adjusted every 15 minutes to a pH of about 5 by addition of dilute hydrochloric acid. After absorption of 2510 parts by volume of hydrogen, the solution contains 6.58 parts of guanidine. This corresponds to a yield of 93.5% of theory, calculated on dicyandiamide.

Guanidine sulfate, guanidine acetate, guanidine phosphate, nad guanidine oxalate are prepared in an analogous manner. The equivalent amount of acid can be added dropwise also in a continuous manner, without interrupting the hydrogenation procedure.

Example 3

10 parts of dicyandiamide in aqueous solution are treated at a temperature of 18° C. in the presence of Raney nickel alternately with hydrogen (pH=7–9.5) and carbon dioxide (pH=6.5–7). After absorption of 2600 parts by volume of hydrogen and 2610 parts by volume of carbon dioxide, 6.73 parts of guanidine are found in the solution, which corresponds to 96 percent of theory, calculated on dicyandiamide.

Example 4

10 parts of dicyandiamide are dissolved in water and treated at a temperature of 18° C. in the presence of Raney nickel with a mixture of 1:1 parts of volume of hydrogen and carbon dioxide (pH=7–8). After termination of the gas absorption 5150 parts of the gas mixture are absorbed, and the solution contains 6.41 parts of guanidine, corresponding to a yield of 91% of theory.

I claim:

1. A process for the simultaneous preparation of guanidine and formamide comprising treating dicyandiamide at substantially atmospheric pressure and at a temperature of about 5° C. to room temperature and at a pH of 4 to 11 with hydrogen in the presence of at least 1 mole of water per mole of dicyandiamide and of a catalyst of the group consisting of Raney nickel and Raney cobalt, and separating the obtained mixture of guanidine and formamide.

2. The process as claimed in claim 1 comprising adding to the reaction mixture an acid in an amount equimolar to the amount of dicyandiamide present, so as to obtain the guanidine in form of the addition salt of said acid, said acid being a member of the group consisting of boric acid, hydrochloric acid, sulfuric acid, phosphoric acid, carbonic acid, and acetic acid

References Cited by the Examiner

UNITED STATES PATENTS 2,653,938   9/1959   Fugate et al. _____ 260—249.9

FOREIGN PATENTS 816,697   10/1951   Germany.
233,840   12/1944   Switzerland.

OTHER REFERENCES

Kato et al.: C.A., volume 27, page 1366 (1933) (Abstr. of Japanese Patent 93,916, December 12, 1936, 3 pages spec.).

Sugino: C. A., volume 34, page 2795 (1940).

CHARLES B. PARKER, *Primary Examiner.*